United States Patent Office 2,927,125
Patented Mar. 1, 1960

2,927,125

CYANO-SUBSTITUTED BORATE ESTERS

Nathaniel L. Remes, Miami, Fla., and Thomas W. Martinek, Crystal Lake, Ill., assignors to The Pure Oil Company, Chicago, Ill., a corporation of Ohio No Drawing. Application November 29, 1957
Serial No. 699,471

14 Claims. (Cl. 260—462)

This invention relates to a composition of matter comprising cyano-substituted borate esters which are useful as selective solvents, as plasticizers, in insecticidal, fungicidal and rodenticidal compositions, and as additives for petroleum and medicinal compositions.

The general formula of these compounds is:

(1) $B[OZ(CN)_m]_3$ wherein Z is a polyvalent organo-radical selected from the group consisting of alkyl, aryl, alkylaryl and arylalkyl radicals such that compounds of the following subgeneric formula are represented:

(a) 
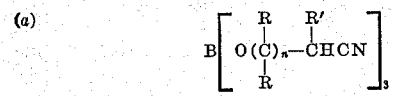

or (b) $B[OAr_n(CN)_m]_3$ wherein R and R' may be the same or different organic radicals, or hydrogen, including alkyl, cycloalkyl, aryl and arylalkyl radicals, $n$ is zero or an integral whole number, Ar is an aromatic nucleus, and $m$ is an integral whole number from 1 to 5 inclusive.

Non-limiting examples of compounds coming within the above formulas are,

Tris(1-cyanoethyl) borate
Tris(1-cyanopropyl) borate
Tris(2-cyanopropyl) borate
Tris(3-cyanopropyl) borate
Tris(4-cyanophenyl) borate
Tris(2-cyanophenyl) borate
Tris(2,4-dicyanophenyl) borate
Tris(cyanobutyl) borate
Tris(cyanopentyl) borate
Tris(cyanohexyl) borate
Tris(cyanomethyl) borate
Tris($\alpha$-cyanobenzyl) borate
Tris(2-cyano-1-phenylethyl) borate Accordingly, it becomes a primary object of this invention to provide a new composition of matter comprising cyano-substituted borate esters. Another object of the invention is to provide a new composition of matter comprising cyano-substituted borate esters of the general formula $B[OZ(CN)_m]_3$ wherein Z is a polyvalent organo-radical and $m$ has a value of from 1 to 5 inclusive.

Another object of this invention is to provide a new composition of matter comprising tris(cyanoalkyl)borates. A further object of the invention is to provide a new composition of matter comprising tris(cyanoaryl) borates. These and further objects of the invention will become apparent as the description thereof proceeds.

The cyano-borate esters of this invention are prepared by the esterification of cyano-alcohols with boric acid or boric oxide, either in the presence or in the absence of a solvent, with the concurrent removal of the water formed in order to shift the equilibrium in a forward direction.

The cyano-alcohol starting materials comprise those alcohols in which the functional cyano and hydroxyl groups are attached to the same carbon atom (the cyanohydrins), or are attached to vicinal carbon atoms, which compounds are prepared in several ways, including the following reactions, respectively:

(1) 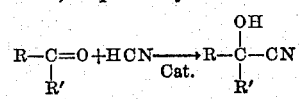

and (2) 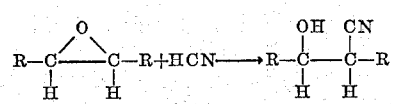

In the foregoing equations R and R' may be hydrogen, an alkyl group containing from 1 to 12 carbon atoms, an aryl group, alkylaryl group, or a monovalent alicyclic group or monovalent heterocyclic group.

These starting materials may be prepared, for example, by the reaction of a halo-substituted alcohol and sodium cyanide in accordance with the following equation:

(3) $HO(CH_2)_nCl + NaCN \rightarrow HO(CH_2)_nCN + NaCl$ to form cyano-alcohols in which the cyano group is separated from the hydroxyl group by three or more carbon atoms, but there are other methods known in the art for preparing the cyano-alcohol starting materials which need not be enumerated here.

The esterification reaction is represented as follows:

(4) 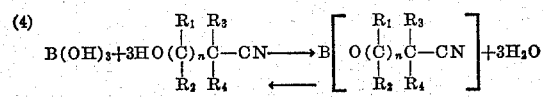

This reaction may be accelerated by the use of catalytic amounts of an acid such as hydrochloric acid, sulfuric acid, nitric acid, acetic acid, and trichloroacetic acid. By catalytic amounts of an acid is meant that amount which promotes the reaction; in general, about 0.1% to 5% by volume of acid based on the volume of reactants is sufficient for this purpose. To further complete the reaction, the resulting mixture is treated physically to remove the water formed, as by simple distillation, or by azeotropic distillation using a diluent or indifferent solvent which forms an azeotrope with the water which boils lower than the cyano-alcohol.

Another method of preparing the cyano-borate esters of this invention is by the reaction of cyano-alcohols with boron trihalides such as boron trichloride, boron trifluoride and boron tribromide according to the following equation:

(5) 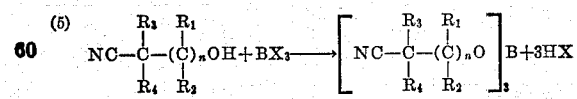

This reaction may be promoted by the use of a proton acceptor, such as pyridine or triethylamine, to remove the HX chemically.

Still another method of preparation comprises the reaction of the cyano-alcohol starting material with a simple borate ester of the general formula, $(RO)_3B$ wherein R may be an alkyl, aryl, alkaryl or arylalkyl group having from 1 to 12 carbon atoms, in accordance with the following reactions:

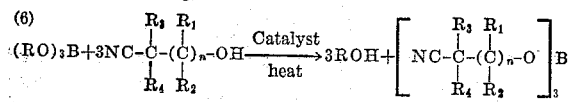

in which R is further characterized by being the radical from a compound having a boiling point lower or higher than that of the cyano-alcohol. It is preferable that the boiling point of the ROH product formed in this reaction be lower than that of the cyano-borate ester formed, since thereby higher molecular weight esters can be formed. Here the reaction is shifted in a forward direction by heating the reactants at a reflux temperature which may vary from about 100° F. to 400° F. with or without the use of a sub-atmospheric pressure which may vary from 750 mm. to about 10 mm. of Hg. Also, the use of an acid catalyst as before enumerated aids the reaction.

In order to more specifically describe the invention, the following examples are given:

EXAMPLE I.—PREPARATION OF TRIS(2-CYANOETHYL) BORATE

Three moles of ethylene chlorohydrin are mixed with about 3.6 moles of sodium cyanide in 250 cc. of ethyl alcohol in a round-bottom flask equipped with stirrer and reflux condenser. The solution is heated for about 4 hours, cooled, and the precipitated sodium chloride filtered off. The filtrate, containing ethylene cyanohydrin, is reacted with about 1.0 mole of boric acid, water being removed as an azeotrope with added toluene. When reaction is complete, as indicated by the absence of an azeotrope, the balance of the toluene and any unreacted ethylene cyanohydrin is stripped off, first at atmospheric pressure and then at reduced pressure, from the reaction product. Tris(2-cyanoethyl) borate remains in the flask as an almost colorless liquid boiling too high to distill under ordinary pressures. Molecular distillation yields a colorless oil, $n_D^{20}$ of 1.4418.

*Analysis.*—Calculated for $B(OCH_2CH_2CN)_3$: C, 48.9; H, 5.4; N, 19.0. Found: C, 49.7; H, 6.1; N, 18.0.

The utility of tris(2-cyanoethyl) borate as a selective solvent for the extraction of aromatic compounds from hydrocarbon mixtures is shown by the following experiments in which the efficiency of the best known nitrile solvents, such as oxydipropionitrile and iminodipropionitrile, were compared with tris(2-cyanoethyl) borate. In these experiments, 5 ml. samples of each solvent were mixed with 5 ml. portions of benzene, heptane, and mixtures consisting of 30 volume percent toluene with 70 volume percent heptane, and 30 volume percent benzene with 70 volume percent heptane. After thorough mixing of the solvent and the hydrocarbon mixtures, the volume changes in the phases and the percent selectivity were observed. The results are shown in the following table:

*Table I*

| Hydrocarbon | Solvent | Solvent Phase | |
|---|---|---|---|
| | | Initial Volume (cc.) | Final Volume (cc.) |
| Benzene | tris(2-cyanoethyl) borate | 5.0 | ¹ 10.0 |
| Do | oxydipropionitrile | 5.0 | ¹ 10.0 |
| Do | iminodipropionitrile | 5.0 | ¹ 10.0 |
| Heptane | tris(2-cyanoethyl) borate | 5.0 | 5.0 |
| Do | oxydipropionitrile | 5.0 | 5.05 |
| Do | iminodipropionitrile | 5.0 | 5.0 |
| 70% heptane–30% benzene | tris(2-cyanoethyl) borate | 5.0 | 5.9 |
| Do | oxydipropionitrile | 5.0 | 5.75 |
| Do | iminodipropionitrile | 5.0 | 5.72 |
| 70% heptane–30% toluene | tris(2-cyanoethyl) borate | 5.0 | 5.60 |

¹ Completely miscible.

From the data in Table I it can be seen that the tris(2-cyanoethyl) borate is completely miscible with the aromatic portion of the hydrocarbon mixtures and immiscible with the paraffinic hydrocarbons. The data also points up the higher selectivity for benzene in comparison to the nitriles listed.

The invention is further illustrated by the non-limiting examples.

EXAMPLE II

A mixture consisting of equal volumes of benzene and tris(2-cyanoethyl) borate was subjected to simple distillation. Pure benzene having a refractive index, $n_D^{20}$, of 1.4999 was recovered in a yield of 90.0 volume percent. This demonstrates that the borate ester solvents of this invention can be recovered from mixtures with the extracted aromatic hydrocarbons. This distillation took place at temperatures up to 200° F.

EXAMPLE III

The extract phase which resulted from contacting a mixture consisting of 70% v. heptane and 30% v. benzene with tris(2-cyanoethyl) borate was distilled as in Example II. The distillate was at least 80% benzene. Distillate obtained by distilling the raffinate phase from the same extraction contained only about 10–13% benzene.

EXAMPLE IV

A mixture comprising 5 cc. of methyl borate and 5 cc. of heptane was prepared at room temperature. The mixture was completely homogeneous, the methyl borate being completely soluble in the heptane. No phase separation occurred on standing for 1 day.

EXAMPLE V

A mixture comprising 5 cc. of tris(2-chloroethyl) borate and 5 cc. of heptane was prepared as in Example IV and gave the same results.

The experiments conducted in Examples IV and V demonstrate the importance of the cyano group in the borate esters and the fact that without this group the esters are inoperative for the purpose of separating aromatics from paraffins.

In addition to the foregoing utility as a selective solvent, the cyano-substituted borate esters of this invention may be used in insecticidal compositions such as fly sprays, sheep dips, or in fungicidal and rodenticidal compositions. The compounds of this invention may be used as plasticizers and as ingredients in petroleum and medicinal compositions. Of the specific examples given, the species of (2-cyanoethyl) borate, (2-cyanopropyl) borate, tris(cyanobutyl) borate, tris(cyanopentyl) borate and (2-cyanophenyl) borate are preferred.

What is claimed is:

1. A composition of matter consisting essentially of a compound of the formula, $$B[OZ(CN)_m]_3$$

wherein Z is a polyvalent organic-radical selected from the group consisting of alkyl, aryl, alkaryl and arylalkyl radicals having from 1 to 12 carbon atoms and $m$ is an integer of from 1 to 5.

2. A composition in accordance with claim 1 in which Z is an alkyl group.

3. A composition in accordance with claim 1 in which Z is an aryl group.

4. A composition in accordance with claim 1 in which Z is an alkaryl group.

5. A composition in accordance with claim 1 in which Z is an arylalkyl group.

6. A composition in accordance with claim 2 in which Z is an ethyl group and $m$ is equal to 1.

7. A composition in accordance with claim 2 in which Z is a propyl group and $m$ is equal to 1.

8. A composition in accordance with claim 3 in which Z is a phenyl group and $m$ is equal to 1.

9. A composition in accordance with claim 3 in which Z is a phenyl group and $m$ is equal to 2.

10. A new composition of matter consisting of tris (2-cyanoethyl) borate.

11. A new composition of matter consisting of tris (2-cyanopropyl) borate.

12. A new composition of matter consisting of tris (2-cyanophenyl) borate.

13. A new composition of matter consisting of tris (cyanobutyl) borate.

14. A new composition of matter consisting of tris (cyanopentyl) borate.

References Cited in the file of this patent

UNITED STATES PATENTS 2,175,805     Jacobson _____ Oct. 10, 1939

UNITED STATES PATENT OFFICE

CERTIFICATE OF CORRECTION

Patent No. 2,927,125            March 1, 1960

Nathaniel L. Remes et al.

It is hereby certified that error appears in the printed specification of the above numbered patent requiring correction and that the said Letters Patent should read as corrected below.

Column 4, line 58, the formula should appear as shown below instead of as in the patent:

$$B\left[OZ(CN)_m\right]_3$$

Signed and sealed this 4th day of April 1961.

(SEAL)
Attest: ERNEST W. SWIDER

~~KARL H. AXLINE~~
Attesting Officer

ARTHUR W. CROCKER
Acting Commissioner of Patents